United States Patent [19]

Crosswhite

[11] 3,736,948
[45] June 5, 1973

[54] WASHING AND SANITIZING APPARATUS FOR CARTS SUCH AS HOSPITAL CARTS

[76] Inventor: Bert Crosswhite, 10745 S.E. Ridgeway Drive, Portland, Oreg. 97266

[22] Filed: July 28, 1971

[21] Appl. No.: 166,832

[52] U.S. Cl. .................... 134/95, 134/123, 134/152, 134/200
[51] Int. Cl. .............................. B60s 3/04, B08b 3/02
[58] Field of Search ......................... 134/45, 95, 123, 134/200, 152

[56] References Cited

UNITED STATES PATENTS

| | | | |
|---|---|---|---|
| 3,511,251 | 5/1970 | Hickman | 134/123 |
| 2,997,048 | 8/1961 | Gertken et al. | 134/123 UX |
| 3,096,775 | 7/1963 | Clarke et al. | 134/123 |
| 3,167,797 | 2/1965 | Hergonson | 134/123 X |
| 3,289,238 | 12/1966 | Sorenson et al. | 134/123 X |
| 3,444,867 | 5/1969 | Thornton | 134/123 |

*Primary Examiner*—Robert L. Bleutge
*Attorney*—Kolisch, Hartwell & Dickinson

[57] ABSTRACT

A washing apparatus especially adapted for washing and sanitizing containers such as hospital carts. The apparatus includes a washing chamber having selectively closable door openings on opposite sides thereof adapted for receiving and dishcarging carts to be washed. A track is provided on the floor of the chamber between the door openings for guiding carts through the chamber. A washing mechanism is provided within the washing chamber, adapted to receive washing and sanitizing fluid from a remote source and to direct a spray of such fluid upon the carts. The washing mechanism is suspended from the ceiling of the washing chamber and includes a first nozzle boom that normally extends vertically down along the outside of a cart positioned within the chamber, and a second nozzle boom that normally extends horizontally above the cart. A washingfluid operated cylinder is provided for selectively moving or pivoting the second nozzle boom downwardly into the interior of the cart, whereby it assumes a vertical position generally opposite the first nozzle boom. A motor is provided for selectively rotating the washing mechanism with respect to the cart during a washing cycle with the force of the spray delivered against the outer surface of the cart by the first nozzle boom being offset by the oppositely directed force of the spray delivered against the inside of thecart by the second nozzle boom. A timer control is provided for automatically controlling the delivery of fluids to the washing mechanism during a washing operation and a blower is provided in a separate drying chamber for circulating hot air around the sanitized cart to dry it.

7 Claims, 9 Drawing Figures

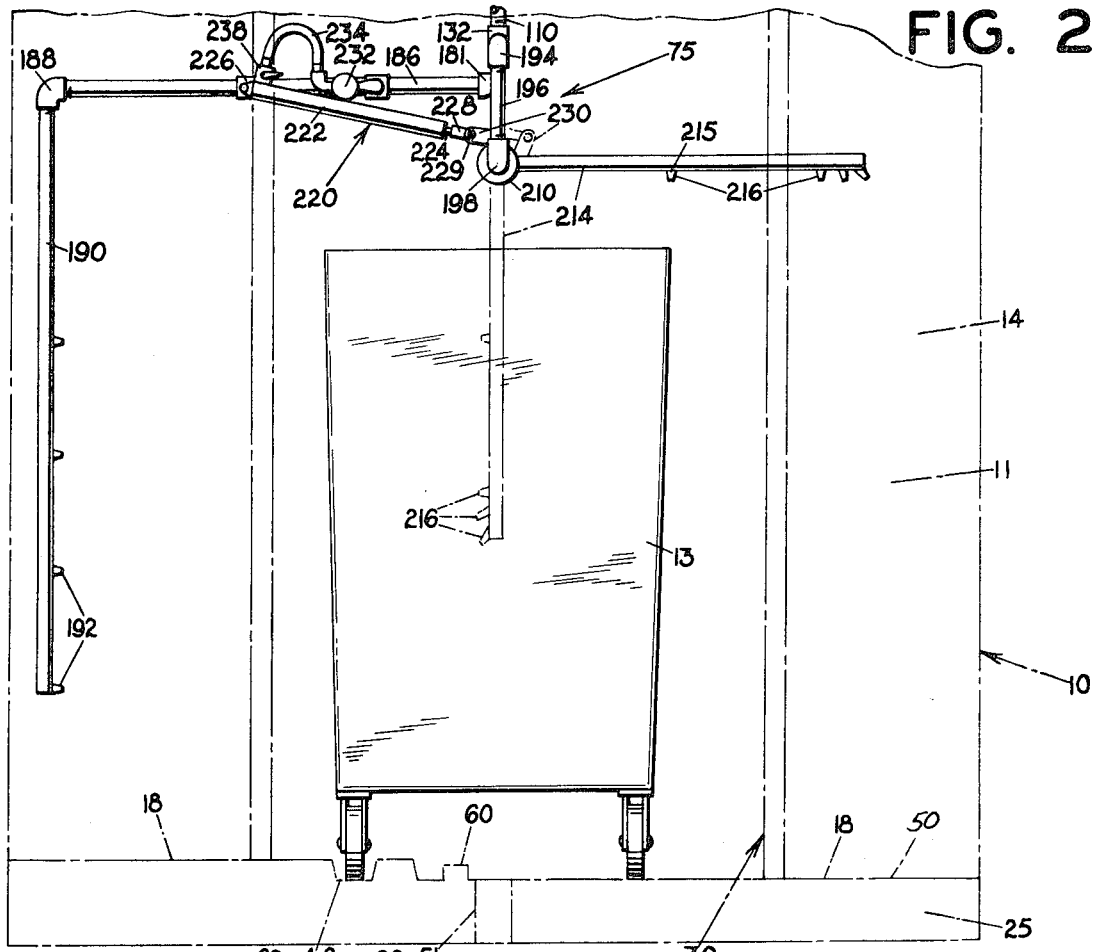
FIG. 2
FIG. 3
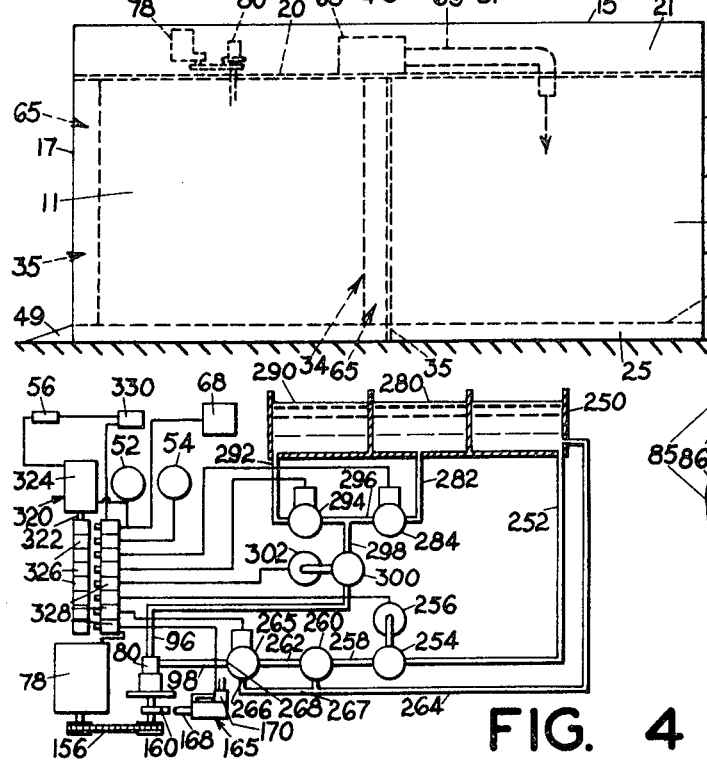
FIG. 4
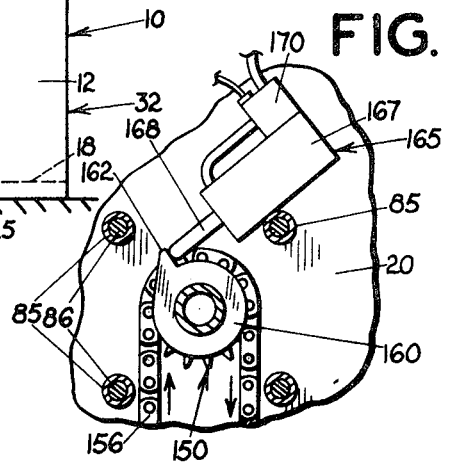
FIG. 6
BERT CROSSWHITE
INVENTOR.
BY Kolisch, Hartwell & Dickinson
ATTY.

PATENTED JUN 5 1973 3,736,948

BERT CROSSWHITE
INVENTOR.

BY Kolisch, Hartwell & Dickinson
ATTY.

WASHING AND SANITIZING APPARATUS FOR CARTS SUCH AS HOSPITAL CARTS

BACKGROUND OF THE INVENTION

The present invention concerns a washing apparatus especially adapted for washing containers. More particularly the invention relates to a washing apparatus especially adapted for washing and sanitizing hospital carts with open tops.

A wide variety of open or uncovered cart-like containers are presently used in industry for various purposes. For example, uncovered wheeled carts or delivery trucks are used in many commercial establishments for handling waste materials, soiled linens, and trash. In addition, similar portable containers are used in restaurants for delivery of food and in hospitals, hotels and motels for carrying clean linens and supplies. In all such uses it is necessary to periodically clean and sanitize the containers. At the present time this is usually done by hand washing the containers.

Hand washing of containers is a time consuming, difficult and expensive task. Consequently, it has been found that in many establishments, such containers are not washed regularly. Furthermore it has been found that some of the hand washed containers are not satisfactorily clean.

SUMMARY OF THE INVENTION

Accordingly, it is an object of the invention to provide a washing apparatus for automatically washing and sanitizing containers such as hospital carts.

It is another object of the invention to provide a washing apparatus for hospital carts which cleans and sanitizes such carts faster, more effectively and more economically than can be done by hand washing.

It is a further object of the invention to provide a washing apparatus having a relatively short automatic washing cycle that can be utilized for washing plastic carts with a high temperature washing fluid.

It is yet another object of the invention to provide an automatic washing apparatus for open or uncovered hospital carts that utilizes a novel washing mechanism capable of directing a spray of washing fluid over both the inside and outside surfaces of the carts.

Still another object of the invention is to provide such a washing mechanism wherein the washing fluid directed against the outside surfaces of the cart being washed is offset or balanced by the force of the washing fluid being directed against the inside surfaces of the cart so that the cart need not be anchored during the washing operation.

These and other objects of the invention are attained in a washing apparatus that includes a washing chamber having door openings in opposite sides thereof adapted for receiving and discharging carts to be washed. Movable doors are provided selectively to close the door openings. A blower is provided in an adjacent drying chamber for circulating hot air around the clean carts to dry them. A guide track and a conveyor are provided on the floor of the chambers between the doors openings thereof for moving carts successively through the washing chamber and the drying chamber.

A washing mechanism is provided within the washing chamber adapted to receive washing and sanitizing fluid from remote sources and to direct a spray of such fluid upon the carts. The washing mechanism is suspended from the ceiling of the washing chamber and includes a first nozzle boom that normally extends downwardly along the outside of a cart positioned within the washing chamber, and a second nozzle boom that normally extends above the cart. A washing-fluid operated cylinder is provided for selectively moving or pivoting the second nozzle boom downwardly into the interior of the cart so that it assumes a vertical position generally opposite the first nozzle boom. Driving means are provided for selectively rotating the entire washing mechanism with respect to the cart during a washing cycle. As the washing mechanism is rotated, the force of the spray delivered against the outer surfaces of the cart by the first nozzle boom is offset or balanced by the oppositely directed force of the spray delivered against the interior cart surfaces by the second nozzle boom. Timing and control means are provided for automatically controlling the delivery of the washing fluid to the mechanism during a washing cycle.

BRIEF DESCRIPTION OF THE DRAWINGS

Other features and advantages of the invention will become apparent from the following detailed description, taken in conjunction with the accompanying drawings, wherein:

FIG. 2 is an end elevation view in section of the washing chamber illustrated in FIG. 1;

FIG. 3 is a diagrammatic side view of the washing and drying chambers of the apparatus illustrated in FIG. 1;

FIG. 4 is a schematic diagram of the fluid supply system and control system for the washing apparatus described;

FIG. 5 is a fragmentary isometric view illustrating the details of the washing mechanism utilized in the apparatus in FIG. 1;

FIG. 6 is an enlarged fragmentary view, in section, taken along line 6—6 in FIG. 5;

FIG. 7 is an enlarged fragmentary view, in cross section, taken along lines 7—7 in FIG. 5;

DETAILED DESCRIPTION OF THE INVENTION

Figure 1:
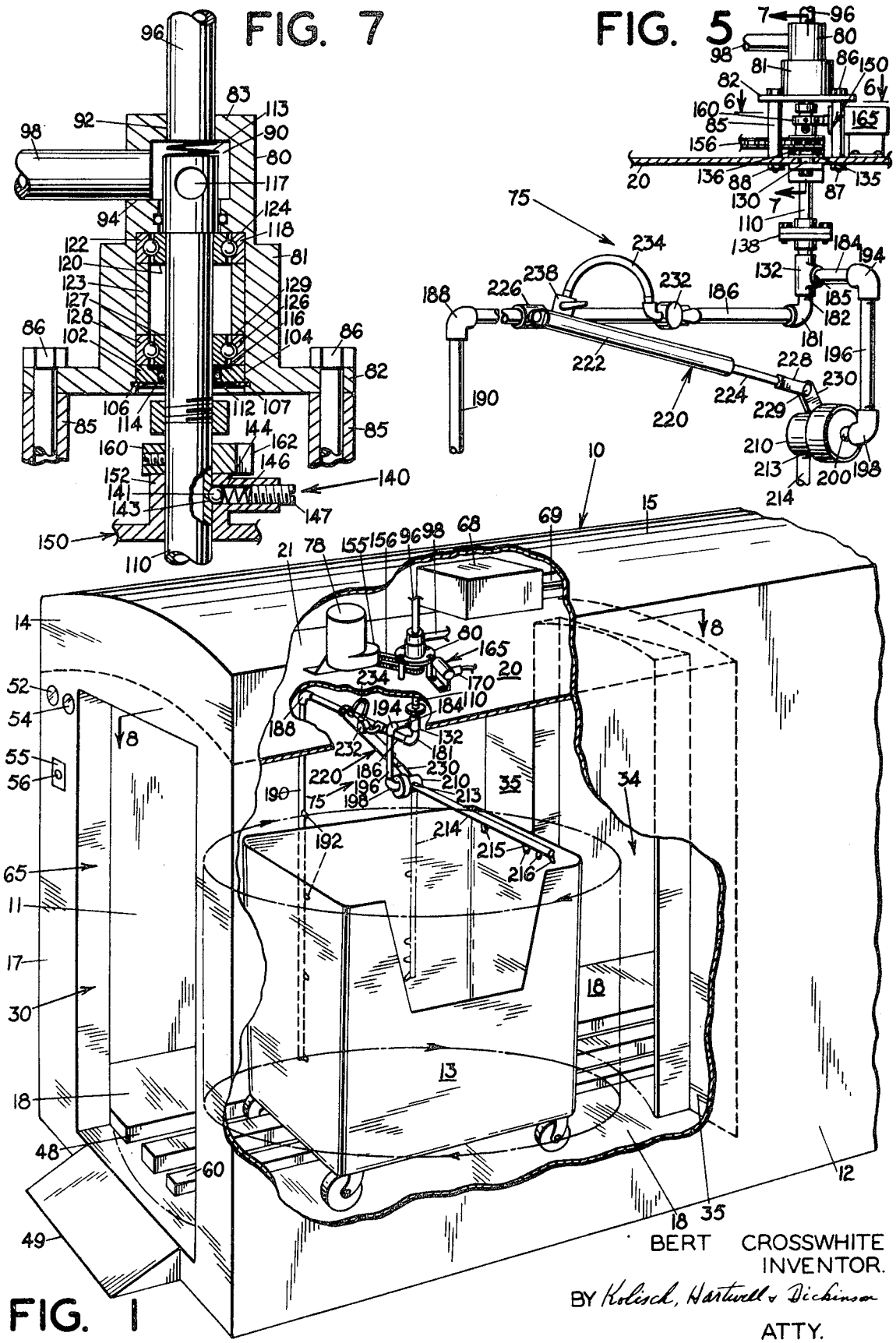
FIG. 1 is a perspective view of the washing apparatus with a cart positioned in the washing chamber.

Referring now to the drawings one preferred embodiment of the invention is described in the form of a washing apparatus especially adapted for washing and sanitizing open hospital carts. However, it should be realized that the washing apparatus described can be utilized for cleaning a wide variety of other containers, such as portable delivery carts and trucks or basket type containers, for example.

Referring particularly to FIGS. 1-3 a washing apparatus 10 is generally indicated comprising a cabinet 14 including a washing chamber 11 and a drying chamber 12. A conventional hospital cart 13 is illustrated within the washing chamber, adapted to be cleaned and santized by the apparatus. The cart includes a floor having wheels secured on the bottom thereof and supporting generally vertical side walls connected to form a cubical chamber having an open or uncovered top. The bottom of each cart is provided with one or more small drainage openings or holes. One side wall of the cart is partially cut down to provide greater ease of loading and unloading. Such carts are conventionally made of fiberglass, stainless steel, or other suitable materials. Carts of the type illustrated are manufactured by McClure Plastics Co., Inc. as Model 600. However, it should be apparent that the cart illustrated is only exemplary and other carts of different materials or configurations could be processed by the washing apparatus described.

The washing chamber and the drying chamber are of approximately equal size, each being adapted to receive and confine one cart during a washing or drying operation. The walls 17, domed ceiling 15 and floor 18 of the cabinet are fabricated of any suitable material, such as fiberglass or stainless steel, that is water resistant.

A partition 20 is provided, extending across both the washing chamber and the drying chamber below ceiling 15 of the cabinet. The area between domed ceiling 15 and correspondingly domed partition 20 comprises an open equipment chamber 21 that extends the full length of the cabinet as illustrated best in FIG. 3. Floor 18 of the cabinet is attached to the side walls approximately 6 inches above the bottom of the cabinet to provide a drainage chamber 25 beneath the cabinet. Door openings 30, 32, respectively, are provided at the opposite ends of the cabinet, adapted to communicate with the washing chamber and the drying chamber. A door opening 34 is provided in a partition 35 positioned between washing chamber 11 and drying chamber 12. Door opening 34 permits carts to be moved from one chamber to the other. The cabinet and door openings can be made of suitable size to accommodate carts of a desired size. However, the embodiment illustrated is intended for use with carts about 3 feet wide and up to 6 feet high.

Figure 8:
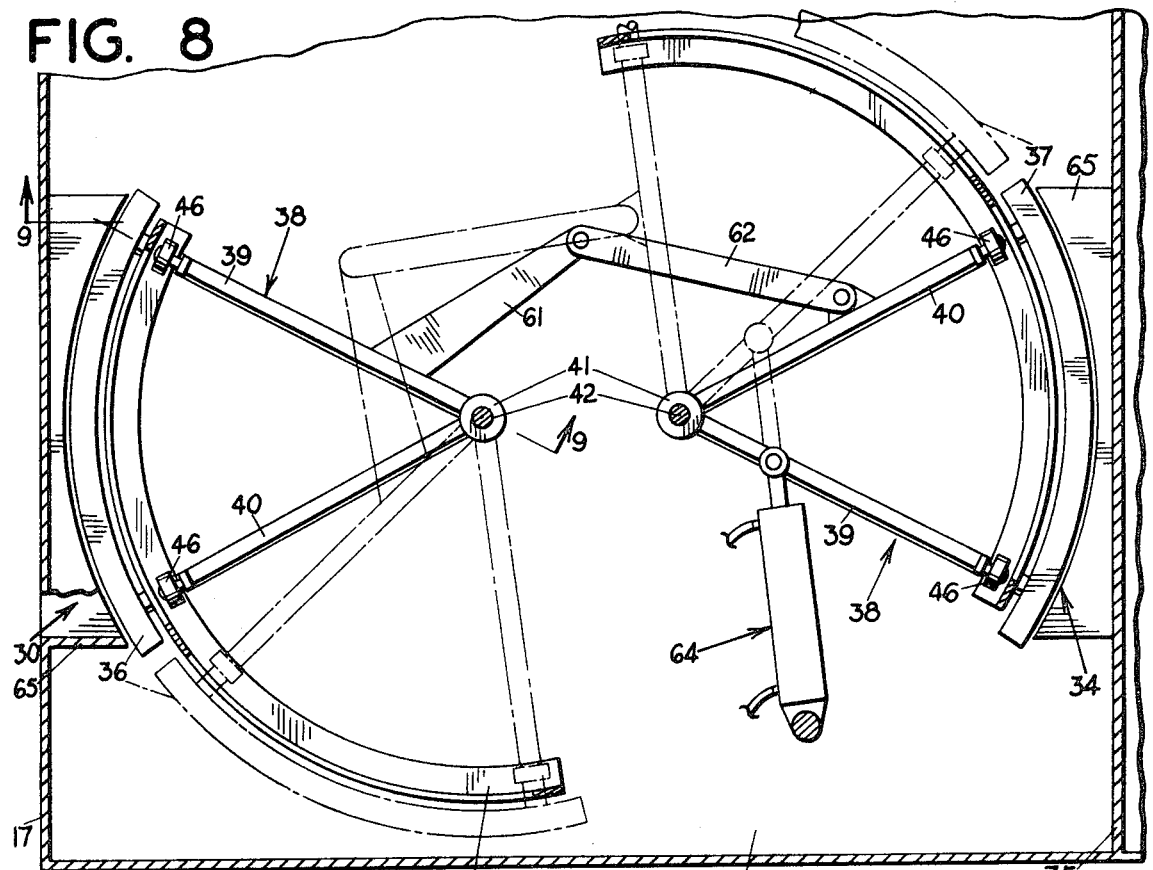
FIG. 8 is a fragmentary top view taken along lines 8—8 in FIG. 1.
Figure 9:
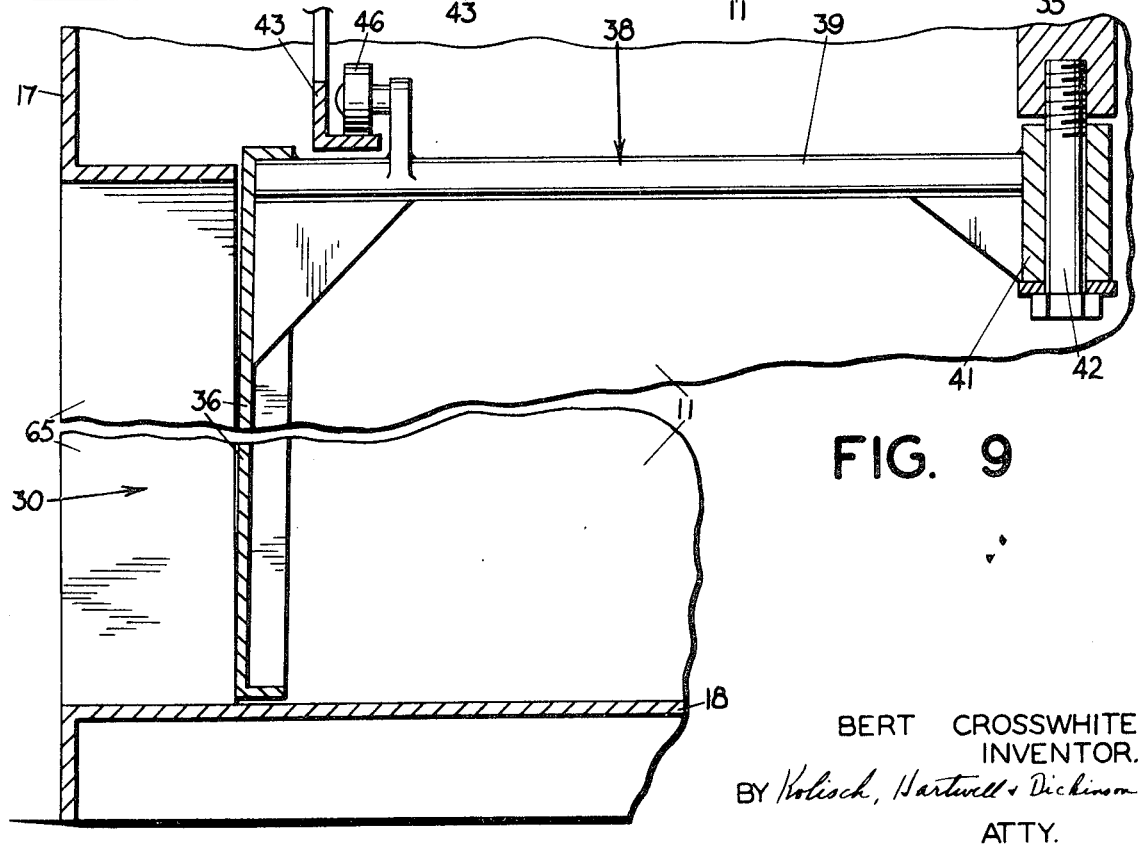
FIG. 9 is a fragmentary side view taken along lines 9—9 in FIG. 8.

Doors 36 and 37 are provided to selectively close door openings 30, 34 respectively, as best illustrated in FIGS. 8 and 9. The doors are of similar design, each being formed with a curved outline between the side edges thereof. The doors are similarly suspended and therefore only one door suspension system will be described, it being understood that like means of the other suspension system are designated by like numerals. Door 36 is supported from the chamber ceiling by a frame 38 that includes angularly spaced arms 39, 40 each attached at its outer end to the upper end of the door by suitable means, such as bolted joints. The inner ends of the arms are joined to a hub 41 that is pivotably secured to a shaft 42 attached to partition 20 of the chamber.

A semicircular track 43 is secured in depending relationship to partition 20. A rotatable wheel 46 is secured to each of arms 39, 40 in alignment with track 43 so that the doors can be moved along the tracks between opened and closed positions by pivoting the arms and hub 41 with respect to shaft 42.

Linkage means are provided for moving doors 36, 37 in unison comprising an arm 62 pivotably secured at one end to arm 40 of the door 37 support assembly and pivotably secured at its other end to an end of an arm 61. The other end of arm 61 is rigidly secured to arm 39 of the door 36 support assembly.

Power means are also provided for operating the doors, comprising a double acting hydraulic ram 64 having its cylinder end connected to partition 20 and its rod end pivotably connected to the middle of one of the arms 39. The ram is supplied with fluid from a suitable source and is operated by suitable control means, to open and close the doors at appropriate times in the cart washing cycle.

As shown in FIG. 1, the end walls of the washing chamber are formed with inwardly extending edges 65 adjacent the door openings so that the curved doors are spaced closely to edges 65, when closed, and form an effective water barrier. A door similar to those described above can be provided in the other end of the drying chamber although this is not essential.

A blower 68 is provided within chamber 21 having an outlet air duct 69 associated therewith that opens into the top of the drying chamber. The blower can be selectively operated, by suitable control means, to dry the sanitized carts in a manner explained hereinafter.

If desired, the drying operations could be carried out within the washing chamber after the washing operation. In that event duct 69 would be connected directly into the washing chamber and the need for a separate drying chamber would be eliminated. This would result in a more compact structure but the time for processing a given cart would be increased.

As best seen in FIG. 2 floor 18 has a depressed channel 48 formed therein, spaced slightly inwardly from one side of door opening 30, to receive and guide the caster or roller of a cart, such as cart 13. A somewhat wider depressed channel 50 is formed in floor 18, spaced near the other side of the door opening, to receive the casters on the other side of cart 11. It should be apparent that, with the floor configuration shown, carts of different widths can be accommodated easily and guided through the washing chamber. The nondepressed surfaces of floor 18 are generally sloped from the outer sides of the cabinet to the center thereof so that fluid within the cabinet will gather in channel 50. A drain opening 51 is provided in channel 50 of the floor to remove washing fluid from the cabinet. A pipe, not illustrated, can be connected between drain opening 51 and a suitable drainage site for the ultimate disposal of the washing fluid.

A movable conveyor or track 60 is provided on the floor of the cabinet extending the length of the cabinet within channel 50. The conveyor is a power-operated conveyor of conventional design and is adapted to be releasably connected to the carts by suitable means to move them through the washing chamber and the drying chamber. Control means can be provided to start and stop the conveyor and carts at the appropriate positions for washing and drying the carts. Alternatively, the carts can be placed in the cabinet by hand and moved from the washing chamber to the drying chamber at an appropriate time by the same mode. A ramp 49 is provided beneath door opening 30 to facilitate entry of the carts, and a similar ramp is provided at the other end of the chamber.

A start switch 55 having a start button 56 is mounted on the outside of the cabinet near door opening 30. A red light 52 and a green light 54 are provided on the outside of the cabinet, also near door opening 30. Red light 52 is energized when the washing apparatus is started and green light is energized upon completion of a washing cycle in a manner explained hereinafter.

A washing mechanism 75 is provided within the washing chamber, suspended from partition 20. The washing mechanism is connected with a conventional coupling 80 positioned in the upper equipment chamber. The outer housing of the coupling is fixed to the partition, and an internal shell of the coupling and the washing mechanism attached thereto are both adapted to be rotated by a motor 78 also positioned in the upper equipment chamber.

Referring particularly to FIGS. 5 and 7 coupling 80 is illustrated comprising an outer wall or casing 81 having an extended flange 82 formed about the lower end thereof. The upper end of the coupling is generally closed by a top wall 83 connected with wall 81. The coupling is suspended above partition 20 on four hollow sleeves or legs 85 which act as stilts for supporting the coupling. The legs are secured in position between partition 20 and flange 82 by bolts 86 that extend through suitable holes in flange 82, through the hollow legs and through suitable holes in partition 20. A nut 88 is received upon the threaded lower end 87 of each bolt.

Coupling 80 includes a hollow internal mixing chamber 90 which is partially bounded by walls 81, 83. A port 92 formed in top wall 83 and a port 94 formed in outer wall 81 of the coupling near the upper end thereof communicate with chamber 90. A pipe 96 is threadably engaged in port 92 to furnish fluid, such as germicidal solution, to chamber 90 in a manner described hereinafter. Another pipe 98 is threadably engaged in port 94 to provide fluid, such as detergent and washing fluid, to chamber 90, also in a manner described hereinafter.

The lower end of mixing chamber 90 is bounded by a plate 102 that fits within a recessed face 104 formed in wall 81 of the coupling. Plate 102 is retained in position by a compressable ring 106 that normally locks in a groove 107 provided in face 104. A pipe 110 extends through an opening 112 formed in the center of plate 102 and communicates with internal chamber 90. A seal 114 is provided, in a slot 116 formed around the periphery of opening 112, to sealingly engage pipe 110. The upper end of pipe 110 is open and a pair of holes 117 are formed in the pipe near the upper end thereof to receive fluid from chamber 90. A compressible spring 113 is provided between the inner end of pipe 110 and the outer wall of the chamber.

Pipe 110 is rotatably supported within chamber 90 by an upper thrust bearing 118 having an inner ring 120 secured to the pipe and an outer ring 122 receives in a slot 124 defined between a sleeve 123 and wall 81 of coupling 80. A lower thrust bearing 126 is also provided, having an inner ring 127 secured to pipe 110 and an outer ring 128 received in a slot 129 defined by sleeve 123, wall 81, and plate 102.

Referring particularly to FIG. 5, pipe 110 extends down through an opening 130 formed in partition 20 and is connected to a coupling 132 of washing mechanism 75. A sleeve 135 is provided around opening 130, being secured to the partition by bolts 136 to serve as a guide bushing for pipe 110.

A toothed gear 150 is provided around pipe 110 just above partition 20, having a collar 152 that is releasably secured to the pipe by a clutch 140. Gear 150 is aligned with a corresponding gear 155 mounted on the shaft of drive motor 78 and a chain 156 is trained around both gears. Accordingly rotation of drive motor 78 causes rotation of pipe 110 and the washing mechanism in a clockwise direction as viewed from the top of the cabinet.

Clutch 140 includes a ball 141 adapted to seat to a depth of about one-half its diameter in a recess 143 formed in pipe 110. The ball otherwise rests in a corresponding opening 144 formed in collar 152. The periphery of opening 144 is threaded and a compressible spring 146 is retained between ball 141 and a plug 147 threadably engaged in opening 144. The force exerted upon the ball by spring 146 is sufficient to enable rotation of pipe 110 and the washing mechanism during normal conditions. However, should the washing mechanism encounter an obstacle within the washing chamber, the ball will be forced out of recess 143 and collar 152 will turn freely upon pipe 110.

Referring to FIG. 6 a positioning device for the washing mechanism is particularly illustrated. A collar 160 is secured to pipe 110 just above gear 150, having a finger 162 extending therefrom adapted to rotate with pipe 110 in the direction indicated by the arrow. A double acting air-operated ram 165 is provided having its cylinder end 167 secured to the upper side of partition 20. The extensible shaft 168 of the ram is aligned with finger 162 when the shaft is extended, so as to prevent the pipe from rotating. However, upon operation of the ram, shaft 168 can be withdrawn into the cylinder to permit free rotation of the pipe. Ram 165 is supplied with air from a suitable source, not illustrated, under the selective control of a solenoid valve 170.

Referring again to FIG. 5 the washing mechanism 75 is illustrated in detail. A coupling 138 is provided in pipe 110 below the partition to facilitate installation of the washing mechanism. Pipe T-coupling 132 is secured at the lower end of pipe 110, having a pipe elbow 181 secured to its lower opening 182 and a short section of pipe 184 engaged in a side opening 185. A length of pipe 186 is secured to the outlet end of elbow 181 and extends in a generally horizontal attitude across the top of the washing chamber. A 90° pipe elbow 188 is secured at the outer end of pipe 186 and an elongate pipe or boom 190 is secured to the outlet end of elbow 188. Boom 190 extends downwardly at a 90° angle with respect to pipe 186 and is adapted to extend generally parallel to the side of a cart positioned within the washing chamber, as is illustrated in FIG. 1. Boom 190 is closed at its lower end and is provided with a plurality of nozzles 192, secured within suitable openings provided at preselected intervals along the boom, to direct a spray of fluid toward the center of the washing chamber and on to the outer surfaces of the cart.

A 90° pipe elbow 194 is secured to the outlet end of pipe 184 and a short length of pipe 196 is secured to the outlet end of elbow 194 extending downwardly at a 90° angle with respect to pipe 184. Another 90° pipe elbow 198 is secured at the outlet end of pipe 196 and a length of pipe 200 is secured to the outlet end of elbow 198 adapted to extend in a generally horizontal attitude toward the center of rotation of pipe 110. A coupling 210 is supported at the end of pipe 200. Coupling 210 is of a conventional design similar to the coupling illustrated in FIG. 7, with pipe 200 occupying the position of pipe 110 as illustrated in FIG. 7. Coupling 210 differs from the coupling illustrated in FIG. 7 in that reverse flow is provided through coupling 210, i.e., fluid flows into the coupling through pipe 200. Furthermore pipe 200 is stationary and the outer shell of coupling 210 is adapted to rotate around the pipe. Also coupling 210 is provided with only a single outlet opening 213 to which a pipe or inner boom 214 is attached. Boom 214 is closed at its lower end and is provided with a plurality of nozzles 216 secured in openings 215 spaced at preselected intervals along the length thereof. Nozzles 216 are positioned to direct a spray upon the surfaces of the cart in a manner explained in detail hereinafter.

A washing-fluid operated hydraulic ram 220 is provided for selectively positioning boom 214. As shown in FIG. 5, ram 220 comprises a cylinder 222 having an extensible shaft 224 secured within the cylinder. The ram is attached at the cylinder end to a bracket 226 that is mounted on pipe 186; and at the shaft end, the ram is attached by means of a clevis 228 and pin 229 to a lever 230. Lever 230 is fixedly secured to the outer wall or casing of coupling 210.

A fluid supply system for ram 220 is provided including a flow reducing valve 232 secured within a suitable opening in pipe 186 adapted to receive washing fluid when such flows in pipe 186. The flow reducing valve is of conventional design and serves to reduce the fluid flow from that available in pipe 186 to a smaller flow suitable for operating the ram. An outlet opening in valve 232 is connected to one end of a flexible hose 234, with the other end of hose 234 being connected to the inlet of a manually operated valve 238. The outlet end of valve 238 is connected to a suitable opening in cylinder 222 of the ram.

A compressed coil spring, not visible, is provided within cylinder 222 adapted to normally bias shaft 224 within the cylinder. With the shaft so positioned, lever 230 and coupling 210 are rotated so that boom 214 extends in a substantially horizontal position, as illustrated in solid outline in FIG. 1. However, upon flow of sufficient fluid into pipe 186 and on through hose 234 to the cylinder, shaft 224 is extended causing coupling 210 and boom 214 to rotate downwardly through a 90° angle so that boom 214 is positioned within the interior of a cart located within the washing chamber, as illustrated in broken outline FIG. 1. Valve 238 can be positioned manually to cut off flow of fluid through line 234. In that event, boom 214 remains in its raised position.

Referring now to FIG. 4 a schematic diagram of a fluid supply system and control system for the washing apparatus is illustrated. Referring to the top of FIG. 4 a hot water reservoir 250 is provided having an outflow line 252 connected to an opening in the bottom thereof to deliver hot water under gravity flow to the inlet of a pump 254 operatively connected to a motor 256. Pump 254 serves to pressurize the hot water and deliver it on the outlet side of the pump through a line 258 to a regulating valve 260. Regulating valve 260 is adapted to maintain a constant pressure in a line 262 connected to the outlet of valve 260. Pjmp 254 works steadily against regulating valve 260 and any excess flow ino valve 260 is bypassed from the valve through a line 264 and returned to reservoir 250.

Line 262 is otherwise connected to the inlet of a solenoid controlled valve 265 having a pair of outlet ports. The first outlet port 266 of valve 265 is connected to bypass line 264 by a line 267. The second outlet port 268 of valve 265 is connected to line 98 that is also connected to inlet port 94 of coupling 80. Valve 265 is normally positioned, when deenergized, to permit fluid flow between its inlet port and its first outlet or bypass port. When energized, the valve is repositioned to permit fluid flow from the inlet port to the second outlet port. Thus, hot water can be selectively supplied from the reservoir through coupling 80 to the booms of the washing apparatus.

Referring again to the upper portion of FIG. 4 a wetting agent reservoir 290 and a germicidal-detergent reservoir 280 are illustrated. A fluid supply line 282 is connected to an opening in the bottom of reservoir 280 for supplying detergent to the inlet of a solenoid controlled valve 284. In similar fashion a fluid supply line 292 is connected to an opening in the bottom of reservoir 290, for supplying wetting agent to the inlet side of a solenoid controlled valve 294. The outlets of valves 284, 294 are connected, respectively, to opposite ends of a line 296. A supply line 298 is connected into the center of line 296 and communicates with the inlet port of a pump 300 operatively connected to a motor 302. The outlet port of pump 300 is connected through a line 96 to the second inlet port 92 of coupling 80. Valves 284 and 294 are adapted to be closed when deenergized and open when energized. Accordingly either wetting agent or germicidal-detergent solution can be selectively supplied from the respective reservoirs through coupling 80 to the washing mechanism.

An electrical timer 320 is provided for controlling the valves and the pump motors. Timer 320 is of a conventional design having a shaft 322 that is rotated at a constant speed by a motor 324, when energized. Shaft 322 supports a plurality of cams 326 secured thereto for rotation. Each cam is associated with one of a corresponding plurality of microswitches 328 positioned adjacent to the cams for operation thereby. Upon rotation of shaft 322 through a predetermined angle, such as one revolution, each cam on shaft 322 opens and subsequently closes the contacts of its corresponding microswitch after an interval which depends upon the length of the cam. The timing of the opening of the contacts of each microswitch can be preset by loosening the appropriate cam on shaft 322, rotating the cam to a desired position and then fixing the cam on the shaft at that position. Accordingly, a programmed sequence of operation for all the cams and switches during one rotation of the shaft can be established.

In the embodiment illustrated the microswitches are numbered one through eight from the motor end of the shaft 322. Each switch is adapted to control the supply of power from a suitable source 330 through a particular power cable to a component of the control system.

More specifically, switch one controls the supply of power to red light 52 on the cabinet and motor 320 of the timer. Switch one also controls the supply of power to blower 68. Switch two controls green light 54 and switch three controls the solenoid of valve 284. Switch four controls the solenoid of valve 294, switch five controls motor 302 of pump 300 and switch six controls motor 256 of pump 254. Switch seven controls the solenoid of valve 262 and switch eight controls the main drive motor 78 and the solenoid 170 for the positioning device.

A typical cycle of operation will now be described, it being assumed that a cart is properly positioned within the washing chamber as illustrated in FIG. 1 and that the hot water, wetting agent and germicidal-detergent reservoirs are full. The start switch button is pushed and motor 320 is energized. A conventional holding circuit is provided, within the start switch housing to hold the motor power on momentarily until the cam of switch one is rotated sufficiently so that timer motor 320 and red light 52 are energized through the switch one power circuit. The timer motor power circuit is then maintained in an energized or closed condition by switch one for a predetermined time, such as the interval of one rotation of shaft 322 and is then deenergized or opened. This time interval defines the length of a cycle of operation of the washing apparatus which in the embodiment described is slightly over thirty seconds. During such interval the timer shaft rotates at a constant velocity, red light 52 is energized, and blower 68 is receiving power whereby hot air is delivered into the drying chamber.

Shortly after timer motor 320 is energized, switches five and six are closed so that power is supplied to motor 302 to operate pump 300, and to motor 256 to operate pump 254. Switches five and six remain closed and these pumps continue to operate throughout the rest of the operating cycle.

With the pumps operating, switch number seven is closed so that valve 265 is operated to permit flow through its second outlet port and hot water is supplied through valve 265 to coupling 80. The hot water supply to coupling 80 is continued throughout the remainder of the 30-second cycle and then cut-off by closure of valve 265. After valve 265 is initially opened switch three is immediately closed and valve 284 is operated to supply germicidal-detergent to pump 300 and through line 302 to coupling 80. The detergent is supplied for about one-half of the 30-second interval. At the end of that time switch number three is opened and solenoid valve 284 is closed. During the supply of detergent and hot water to coupling 80 the fluids are thoroughly mixed in chamber 90 of the coupling to insure effective distribution of the detergent in the hot water. The mixture of fluid is then delivered through pipe 110 to the washing booms.

Upon the initial delivery of fluid through pipes 110 and 186 the fluid operates ram 220 and rotates coupling 210 and boom 214 through a 90° angle so that boom 214 is positioned and maintained within the interior of a cart to be washed. If boom 214 is not to be utilized in a given washing operation, valve 238 is operated manually before the cycle is initiated to cut off flow through line 234 so that fluid does not reach ram 220.

A short interval after boom 214 is positioned within the cart and fluid is delivered to the boom nozzles, switch eight is closed so that power is delivered to solenoid 170 and to the main drive motor 78. The solenoid operates to move lever 165 to the noncontact position so that pipe 110 is free to rotate, driven by the main drive motor. Pipe 110 and the entire washing mechanism are then rotated in a clockwise direction, as viewed from the top of the cabinet, through a predetermined number of rotations. In the embodiment described, the main drive motor is adapted to operate at a speed which will drive the booms of the washing mechanism through approximately four revolutions during a 30-second washing interval. During the first two revolutions a mixture of detergent and hot water is directed through the nozzles of both booms against the surfaces of the cart. It should be noted that the force of the spray from the respective booms is directed in relative opposition against the vertical walls of the cart. Accordingly, the cart is not blown about by the spray and need not be anchored within the washing chamber.

After about 15 seconds, switch three is opened and the supply of detergent to the booms is stopped. Upon cessation of the detergent, switch four is closed so that solenoid valve 294 is operated to deliver a wetting agent to pump 300 and coupling 80. The wetting agent is provided for a 15-second interval during which time it is mixed with the hot water in coupling 80 and supplied to the booms. The mixture of wetting agent and hot water is directed upon the cart in the same fashion as the other fluids. This serves to apply a uniform coating of wetting agent to all the sprayed surfaces. The wetting agent is used to lower the surface tension of the water to cause it to run off the cart rather than form beads on the surface thereof. This greatly speeds the drying of the cart.

At the end of the 30-second washing cycle, all the switches except one and two are opened whereby power is cut off to the pumps and valve solenoids. Power is also removed from motor 78 and solenoid 170. This causes movement of shaft 168 to a position that will engage finger 162. Consequently as pipe 110 rotates freely under the momentum of the deenergized main drive motor, finger 162 engages the end of shaft 168 and pipe 110 is stopped with boom 214 positioned adjacent the open side of the cart. Thereafter, upon reduction of the fluid pressure in ram 220, shaft 224 is withdrawn by spring force into cylinder 222 and boom 214 is lifted from within the interior of the cart.

After an interval of a few seconds, switch two is closed energizing green light 54 to indicate the end of the washing cycle. Switch one is then opened, switching off the supply of power to the timer motor, to red light 52 and to the blower. Switch 2 is held closed by a delay circuit for a short interval such as 10 seconds, after which the switch opens and the green light is deenergized. The washing apparatus is then ready for the initiation of the next washing cycle. During the next washing cycle, the disinfected cart can be positioned in the drying chamber and dried by the hot air furnished to the chamber during the cycle. In the event no other carts are to be washed, the blower can be separately energized by a power circuit not illustrated to dry the cart. Should it be desired to use a drying cycle that is longer than the washing cycle, the timer can be programmed appropriately. A washed cart would then be left in the washing chamber until the drying cycle is completed. This has some advantage since it affords the wetting agent more time to perform its function.

A separate control circuit can be provided to enable automatic opening of the doors of the chamber and automatic advance of the cart within the washing chamber.

It has been found that the washing apparatus described herein operates very effectively with carts of the types illustrated, that are fabricated of stainless steel or glass-reinforced plastic. The washing apparatus is advantageous in that it produces a thoroughly clean and disinfected cart within a short washing cycle without hand labor. Furthermore, the use of hot water during the short washing interval does not deteriorate or soften the fiberglass used in the carts, as often happens during hand washing operations that utilize hot water or steam. This enables effective washing of carts with hot water which was heretofore not practical.

While the apparatus illustrated has been described for the purpose of washing open sided carts, it should be apparent that other containers, such as barrels and buckets could be washed therein, with boom 214 being positioned in its overhead position for directing a spray down upon the surfaces thereof.

It is claimed and desired to secure by Letters Patent:

1. Washing apparatus adapted for sanitizing delivery carts comprising:
   a washing chamber adapted to receive a cart to be washed,
   first nozzle means suspended within the chamber for directing a spray of washing fluid against the exterior surfaces of a cart positioned within said chamber,
   second nozzle means suspended within said chamber for directing a spray of washing fluid against the interior surfaces of a cart positioned within said chamber
   a supply of washing fluid which may be selectively connected to said first and second nozzle means,
   power means connected to both nozzle means for selectively moving said nozzle means in a circumferential path with respect to said cart and
   washing fluid operated means connected to said second nozzle means for positioning said second nozzle means within the interior of said cart when washing fluid is supplied to said washing apparatus.

2. A washing apparatus as described in claim 1 and a valve in the fluid circuit of said second nozzle means positioned upstream of the washing fluid operated means which valve may be operated to control movement of the second nozzle means from a normally horizontal position into a vertical position.

3. Washing apparatus as described in claim 1 further including
   means connecting said second nozzle means for movement by said power means, with said second nozzle means being oriented, when positioned within the interior of said cart, to direct a spray in a direction opposite to the spray from said first nozzle means so that the spray force exerted on the cart by said first and second nozzle means are substantially balanced as the nozzle means are moved in unison by said power means.

4. Washing apparatus as described in claim 3 wherein said washing chamber comprises a walled enclosure of generally cubical form having door openings on two opposite sides thereof adapted to respectively receive and discharge carts and closing means for selectively closing said door openings.

5. Washing apparatus as described in claim 4 wherein said washing chamber includes retaining means on the floor of said chamber for aligning the carts with respect to the door openings, and wherein said closing means comprise doors movably suspended within said washing chamber.

6. Washing apparatus as described in claim 1 further including valve means adapted to be connected to said fluid supply and to a detergent supply;
   conduit means connecting said valve means to said first nozzle means, and
   timer means for controlling said valve means in a predetermined sequence to selectively deliver a mixture of fluid and detergent to said first nozzle means.

7. Apparatus for simultaneously washing the inside and outside of carts comprising
   a washing chamber adapted to receive a cart,
   a pair of doors each one of which is mounted in an opening in opposite sides of the chamber,
   washing means in the chamber comprising,
   a first boom vertically mounted in said chamber for directing washing fluid against the exterior surfaces of the cart,
   a second boom normally extending at right angles to the first boom for directing washing fluid against the interior surfaces of a cart,
   means for connecting both of said booms to a source of washing fluid,
   power means for moving said booms in a circular path with respect to the cart, semicircular track means provided in the top of the washing chamber adjacent said openings, doors for each opening operatively connected to said track means, linkage connection means between said doors so that they open and close simultaneously, and power means for controlling operation of said doors.

* * * * *